(12) United States Patent
Corvinelli et al.

(10) Patent No.: US 10,643,132 B2
(45) Date of Patent: *May 5, 2020

(54) CARDINALITY ESTIMATION USING ARTIFICIAL NEURAL NETWORKS

(71) Applicant: International Business Machines Corporation, Armonk, NY (US)

(72) Inventors: Vincent Corvinelli, Mississauga (CA); Huaxin Liu, Delta (CA); Mingbin Xu, Scarborough (CA); Ziting Yu, Toronto (CA); Calisto P. Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 1079 days.

This patent is subject to a terminal disclaimer.

(21) Appl. No.: 15/078,302

(22) Filed: Mar. 23, 2016

(65) Prior Publication Data

US 2016/0275398 A1    Sep. 22, 2016

Related U.S. Application Data

(63) Continuation of application No. 14/639,157, filed on Mar. 5, 2015.

(51) Int. Cl.
*G06F 16/2455*    (2019.01)
*G06N 3/08*    (2006.01)
(Continued)

(52) U.S. Cl.
CPC ......... *G06N 3/088* (2013.01); *G06F 16/2455* (2019.01); *G06N 3/0472* (2013.01); *G06N 3/06* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 5,995,957 A | 11/1999 | Beavin et al. | |
| 6,108,648 A | 8/2000 | Lakshmi et al. | |
| (Continued) | | | |

FOREIGN PATENT DOCUMENTS

CN    101599138 A1    12/2009

OTHER PUBLICATIONS

Selmic et al. "Neural-Network Approximation of Piecewise Continuous Functions: Application to Friction Compensation", IEEE Trans. NN, 2002, pp. 745-751.*

(Continued)

*Primary Examiner* — Li Wu Chang
(74) *Attorney, Agent, or Firm* — Isaac J. Gooshaw

(57) ABSTRACT

In an approach for generating a selectivity estimation, one or more processors generate an artificial neural network and receive a DBMS query comprising one or more predicates. One or more processors replace one or more predicates in the one or more predicates that have strict operators with one or more predicates that have non-strict operators. One or more processors generate a selectivity function from the one or more predicates that has one or more arguments that are each comprised of an upper bound and a lower bound for a value in a predicate. One or more processors generate a training data set from a data distribution in the database and train the artificial neural network on the training data set to compute the selectivity function. One or more processors generate a selectivity estimation with the artificial neural network for one or more predicates in the DBMS query.

10 Claims, 7 Drawing Sheets

(51) Int. Cl.
   *G06N 3/04* (2006.01)
   *G06N 3/06* (2006.01)
   *G06N 20/00* (2019.01)

(56) References Cited

U.S. PATENT DOCUMENTS

| | | | |
|---|---|---|---|
| 6,272,487 | B1 | 8/2001 | Beavin et al. |
| 6,738,755 | B1 | 5/2004 | Freytag et al. |
| 6,865,567 | B1 | 3/2005 | Oommen et al. |
| 7,512,629 | B2 | 3/2009 | Haas et al. |
| 7,890,491 | B1 | 2/2011 | Simmen |
| 7,958,113 | B2 | 6/2011 | Fan et al. |
| 8,126,872 | B2 | 2/2012 | Corvinelli et al. |
| 8,135,701 | B2 | 3/2012 | Kutsch et al. |
| 8,386,450 | B2 | 2/2013 | Simmen |
| 8,630,999 | B2 | 1/2014 | Corvinelli et al. |
| 2003/0195881 | A1 | 10/2003 | Koo et al. |
| 2004/0181521 | A1 | 9/2004 | Simmen |
| 2008/0306903 | A1 | 12/2008 | Larson et al. |
| 2011/0029507 | A1 | 2/2011 | Au et al. |
| 2016/0260011 | A1 | 9/2016 | Corvinelli |
| 2017/0323200 | A1 | 11/2017 | Corvinelli et al. |

OTHER PUBLICATIONS

Cybenko, "Approximation by Superpositions of a Sigmoidal Function," Mathematics of Control, Signals, and Systems, 1989, p. 303-314, vol. 2, Springer-Verlag New York Inc.

Getoor et al., "Selectivity Estimation using Probabilistic Models," SIGMOD '01, May 21-24, 2001, p. 461-472, ACM, Santa Barbara, California, USA.

Heimel et al., "A Bayesian Approach to Estimating the Selectivity of Conjunctive Predicates," Datenbanksysteme in Business, Technologie and Web (BTW), 2009, p. 47-56, Lecture Notes in Informatics, Gesellschaft für Informatik, Bonn.

IBM, "Statistical Views," IBM DB2 10.5 for Linux, UNIX, and Windows Documentation, p. 1-4, IBM Knowledge Center, http://www.ibm.com/support/knowledgecenter/api/content/nl/en-us/SSEPGG_10.5.0/com.ibm.db2.luw.admin.perf.doc/doc/c0021713.html, Accessed on May 3, 2016.

Kapoor et al., "Understand column group statistics in DB2," IBM developerWorks Technical Library, Dec. 21, 2006, p. 1-19, http://www.ibm.com/developerworks/data/library/techarticle/dm-0612kapoor/, Accessed on May 3, 2016.

Markl et al., "Consistently Estimating the Selectivity of Conjuncts of Predicates," Proceedings of the 31st VLDB Conference, 2005, p. 373-384, Very Large Data Base Endowment, Trondheim, Norway.

Mell et al., "The NIST Definition of Cloud Computing," National Institute of Standards and Technology, Sep. 2011, p. 1-3, Special Publication 800-145.

Selmic et al., "Neural-Network Approximation of Piecewise Continuous Functions: Application to Friction Compensation," IEEE Transactions on Neural Networks, May 2002, p. 745-751, vol. 13, No. 3.

White, "Cardinality Estimation for Multiple Predicates," SQLPerformance.com, Jan. 15, 2014, p. 1-8, SQL Sentry, LLC, http://sqlperformance.com/2014/01/sql-plan/cardinality-estimation-for-multiple-predicates, Accessed on May 3, 2016.

Corvinelli et al., "Estimating Cardinality Selectivity Utilizing Artificial Neural Networks", U.S. Appl. No. 15/899,746, filed Feb. 20, 2017.

List of IBM Patent Applications Treated As Related, "Appendix P", Dated Feb. 27, 2018, 2pages.

IBM Appendix P, list of IBM patents or patent applications treated as related, pp. 1-2.

Boulos, Jihad, et al.; "Selectivity Estimation Using Neural Networks", provided on search dated Apr. 2, 2014, pp. 1-21.

Kwanglat, Prariwat, et al.; "Query Transformation for Exact Cardinality Computing"; IEEE; Copyright 2011 IEEE, pp. 514-518, Mar. 11-13, 2011.

Lakshmi, Seetha, et al.; "Selectivity Estimation in Extensible Databases—A Neural Network Approach"; Proceedings of the 24th VLDB Conference, New York, USA; 1998; pp. 623-627.

Liu, Henry, et al.; "Cardinality Estimation Using Neural Networks"; Aug. 30, 2013, pp. 1-11.

U.S. Appl. No. 14/639,157, entitled "Cardinality Estimation Using Artificial Neural Networks", filed Mar. 5, 2015.

* cited by examiner

CARDINALITY ESTIMATION USING ARTIFICIAL NEURAL NETWORKS

BACKGROUND OF THE INVENTION

The present invention relates generally to the field of database systems, and more specifically to query optimization on a database management system (DBMS).

The advent of economical, yet powerful computers made possible by advances in processor, memory and data storage devices has made computers an integral part of modern companies. An important class of applications for these computers includes a DBMS where information is collected and organized according to a data model and searched for information via queries. The DBMS allows users to perform operations such as locating, adding, deleting and updating records stored in the computer without a detailed knowledge of how the information making up the records is actually stored in the computer.

One common type of DBMS is known as a relational DBMS in which stored information appears to the user as a set of tables, each of which is termed a relation. In each relation, the information is arranged in rows and columns, with columns of data being related to each other by one or more predetermined functions.

To access particular information in a relational DBMS, a query compiler converts a user request that is typically expressed in a Structured Query Language (SQL) into a sequence of operations to be performed on one or more relations to yield a solution responsive to the user's request. The user's request often includes one or more conditional statements that express the conditions that information in a solution must satisfy. These conditional statements may be expressed as multiple logical predicates (e.g., greater than, less than, etc.) that evaluate to true or false when applied to the information in the relational DBMS. Each time a conditional statement is met (returns true) by the information in a row, the row is returned as a result. To minimize processing time and utilize resources more efficiently, a query optimizer is typically deployed to minimize disk input/output, memory usage, and processor loading, thus providing a decreased expected processing time and cost for performing operations associated with the query.

The optimizer uses information about the relations including statistical information and other characteristics of the relations to translate the query into an efficient query execution plan. The query execution plan defines the methods and sequence of operations, including where predicates are applied in order to access the data and return the appropriate information sought.

In order for the optimizer to generate a good query plan (i.e., a sequence of operations that minimizes cost and execution time) accurate cost estimates of alternative plans are needed. Cost estimates typically are expressed as a combination of expected number of disk I/Os, number of rows that must be processed, and the CPU cost of evaluating the predicates and the various operations on the data processed to answer the query. If the estimates are inaccurate, the optimizer may produce an inefficient query execution plan, resulting in poor search performance.

An important metric in the optimization process, known as cardinality, is the number of rows in the result set or an interim stage within the query execution plan. In order for a database query optimizer to evaluate the cost of different access plans, it must accurately estimate the cardinality at each stage of an access plan. I/O and CPU costs used to compare the various alternative access plans are very strongly influenced by the cardinality estimates. These costs are used to decide the access method for each relation, order in which relations are accessed, and type of operation, for example, which relations should be joined first and what join methods should be used. For this reason, generating good cardinality estimations is important. The application of a predicate to a relation includes and excludes certain rows of data and reduces the cardinality by a factor called the selectivity. The selectivity of a predicate is a measure of the reduction effect that the predicate often has on the cardinality.

A predicate imposes one or more conditions on the data in the rows to be included in the result set, which often reduces the number of rows that are candidates for inclusion in the result set. Therefore, the estimated cardinality associated with steps in a plan is derived directly from the estimated selectivity of the predicates in the steps.

It is common to treat the predicates of a query independently when computing the total selectivity of multiple predicates. However, the information manipulated by the predicates can be statistically correlated (i.e., they are related in some, perhaps non-obvious, way), and thus the net selectivity of the query is not always a product of the individual selectivity of each of the predicates in the query.

In a technique often used to evaluate the cost of alternate query execution strategies, an optimizer calls a selectivity estimation routine that accesses statistics stored in system tables relating to selectivity. The process of accumulating and maintaining useful up-to-date statistics can be quite complex and computationally intensive. Therefore, the development of non-statistical methods to estimate relational DBMS query predicate selectivities, and especially the development of those methods that can accommodate statistically correlated predicates is a valued and an active area of research.

SUMMARY

Aspects of an embodiment of the present invention disclose a method for generating a selectivity estimation. The method includes generating, by one or more processors, an artificial neural network with a hidden layer comprising one or more neurons, wherein the one or more neurons are grouped into one or more groups of neurons, wherein each neuron in a group of neurons in the one or more groups of neurons compute with a common jump activation function. The method further includes receiving, by one or more processors, a DBMS query comprising one or more predicates, wherein a predicate in the one or more predicates operates on one or more database columns. The method further includes replacing, by one or more processors, a first predicate, in the one or more predicates, that operates on a first value with operator =, with a second predicate that operates on the first value with operator ≥ and a third predicate that operates on the first value with operator ≤. The method further includes replacing, by one or more processors, a fourth predicate, in the one or more predicates, that operates on a second value in a first database column with operator <>, with a fifth predicate that operates on the second value with operator > and a sixth predicate that operates on the second value with operator <. The method further includes replacing, by one or more processors, a strict range operator > in a seventh predicate, in the one or more predicates, that operates on a third value in a second database column, with a non-strict range operator ≥ that operates on a fourth value in the second database column, wherein the fourth value is a smallest value in the second database column that is greater than the third value. The method further includes replacing, by one or more processors, a strict range operator < in an eighth predicate, in the one or more predicates, that operates on a fifth value in a third database column, with a non-strict range operator ≤ that operates on a sixth value in the third database column, wherein the sixth value is a largest value in the third database column that is less than the fifth value. The method further includes generating, by one or more processors, a selectivity function from the one or more predicates, wherein the selectivity function has one or more arguments, wherein an argument in the one or more arguments is an upper bound and a lower bound for a value in a predicate in the one or more predicates. The method further includes generating, by one or more processors, a training data set for the artificial neural network from a data distribution in the one or more database columns. The method further includes training, by one or more processors, the artificial neural network on the training data set to compute the selectivity function. The method further includes generating, by one or more processors, a selectivity estimation with the artificial neural network for one or more predicates in the DBMS query.

DETAILED DESCRIPTION

Figure 1:
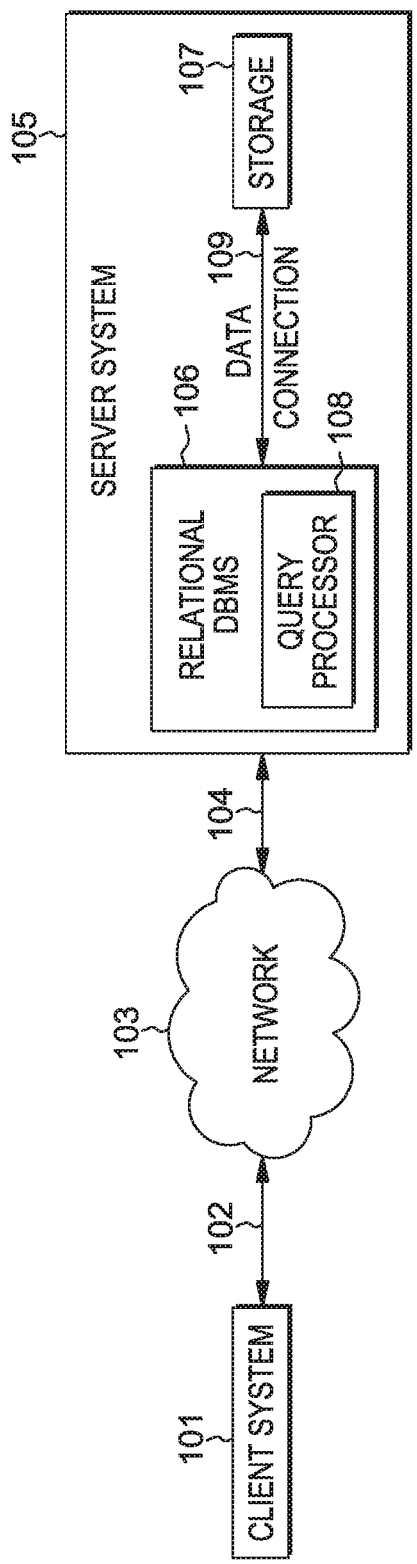
FIG. 1 depicts a block diagram of a portion of a computing complex, in accordance with an embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Query processing refers to the range of activities involved in extracting data from a database. The activities include a translation of queries that a user presents in a high-level database language (e.g., SQL) into expressions that can be used at the physical level of the file system. Also included are a variety of query-optimizing transformations and the actual evaluation of queries. The three basic steps involved in processing a query are query translation, query optimization, and query evaluation.

Query optimization is the process of selecting the most efficient query-evaluation plan from among the many strategies that are usually possible for processing a given query. The number of potential strategies increases with query complexity. The difference in cost (in terms of evaluation time) between a good strategy and a poor strategy is often substantial, and may be several orders of magnitude. Hence, it is worthwhile for a system to spend a fair amount of time on the selection of a good strategy for processing a query, even if the query is executed only once.

Usually a plurality of constraints are embedded in a query that restrict the information returned from the query to objects that have certain desired values and/or ranges of values. A constraint associated with a query is often expressed in a search condition with one or more predicates. A predicate generally consists of two expressions and a comparison operator (>,≥, <, ≤, =, <>). A range predicate which incorporates one or more of the following >, ≥, <, ≤, constrains the information returned in a response to a query to a range of values or to a value that is specified in the predicate. A predicate with comparison operators =, <> can be rewritten into a pair of range predicates. For example the equality predicate on a column 'age' namely age=25 is equivalent to predicates age≥25 AND age≤25. Similarly age <>25 can be rewritten to age>25 OR age<25.

The selectivity of a complex predicate may be derived from that of simpler predicate forms. For example, the selectivity of (age>25 OR salary<25000) is (s1+s2−(s1*s2)) where s1 is the selectivity of (age>25) and s2 is the selectivity of (salary<25000). The selectivity of predicate age IN (10, 15) is equal to s10+s15 where s10 is the selectivity of age=10 and s15 is the selectivity of age=15. A query strategy consists of applying a sequence of predicates that express the query's constraints on requested information to a database. Since the result of the query must meet all the constraints, the predicates that express the constraints, can be applied in any order. Each application of a predicate can be a step in the query strategy, and the sequence in which the predicates are applied is contrived to reduce the amount of information that must be analyzed and manipulated to satisfy the query. For example, in an approach in which each predicate is applied to the information selected by preceding predicates, it is advantageous to apply those predicates that return the least amount of information first, before applying those predicates that would have returned more information had they been applied earlier in the sequence. Therefore, in order to schedule an efficient sequence, the amount of information likely to be returned by a given predicate must be estimated in advance.

Cardinality is a measure of the amount of information returned in a query of a database table. In SQL, for example, the cardinality of a table (a relation) in the database refers to the number of rows in the table. The application of a predicate, and the constraints it represents, reduces the cardinality by a factor called the selectivity. The selectivity of a predicate is a measure of a reduction effect that the predicate often has on the total number of rows of information in a table (i.e., the cardinality) that can meet a constraint expressed in the relational predicate. A query optimizer estimates a selectivity of a predicate to determine when its application during the execution of a query is cost-efficient relative to the application of other predicates in the query. A general principle is that it is advantageous to apply a predicate before other predicates if it selects a smaller number of rows in a table relative to that selected by other predicates, i.e. when the selectivity of the predicate is higher than that of other predicates. Embodiments of the present invention recognize that an artificial neural network architecture that can successfully learn a function that estimates the selectivity of a predicate in a query is of high value to query optimization.

An artificial neural network, often called an artificial neural net or neural net, is used in many applications to recognize a pattern or a function for which the neural net has been trained to recognize. An artificial neural network is a lattice of individual artificial neurons that are connected to each other. The artificial neurons are often arranged in layers in a lattice with the outputs of the neurons in a layer connected to the inputs of the neurons in a next layer. An artificial neuron is modeled on a biological neuron, which is comprised of dendrites that carry input signals (often originating in the outputs of other neurons) to a cell body that processes the inputs and produces an output signal on an axon. The signal on the axon is often an input to one or more synapses that each provide a connection to one or more dendrites (inputs) on other neurons.

In an embodiment, an artificial neuron is comprised of one or more inputs, each of which is assigned a weight, an activation function, and an output. An artificial neuron multiplies a value asserted on an input by a weight that has been assigned through training to that particular input and sums the values so created from each of its inputs. This sum is then used as the argument to a non-linear function called the activation function. The output of the artificial neuron is the value created by the activation function operating on this argument. The nature of the activation function is tailored to the overall function of the neural net. Training the artificial neural net consists of adjusting the weights on the inputs to the artificial neurons in the artificial neural net until a desired output is achieved on training data. Techniques are available, e.g., back-propagation, that enable a neural net to be automatically trained on data that is representative of the data of interest to provide a desired output on the data of interest.

A commonly used activation function in an artificial neuron is the sigmoid function:

$$y(\mu) = \frac{1}{1 + e^{-\alpha\mu}} \quad \text{Equation (1)}$$

In equation 1, the sigmoid function is a bounded, non-decreasing function of μ. It approaches 0 as μ approaches −∞, is ½ at μ=0, and approaches 1 as μ approaches +∞. The optional parameter α controls the slope in the middle region and the response approximates a step function with large values of α. Normally α=1 since an effect equivalent to adjusting α can be obtained by scaling the weights of the inputs to the neurons. The hyperbolic tangent function (tanh) is also commonly used as an activation function and other functions are sometimes used. However, back-propagation and other gradient based neural net training methods require that the activation function be differentiable, which is true for the sigmoid and tanh functions. In an embodiment, all the artificial neurons in a given artificial neural net use the same general type of activation function but possibly with different values for the activation function's parameters, which will alter aspects of the activation function's behavior.

An appropriately configured neural net is known to be able to learn any continuous function to any desired accuracy. It is known to those skilled in the art that the Universal Approximation Theorem essentially states that a neural network with a single hidden layer of neurons (a layer not visible to the input or output) is capable of learning and approximating a continuous function to an arbitrary degree of accuracy as more and more neurons are added to the network. However, the selectivity of a group of predicates relative to a database table, as the limits of the predicates vary, is discontinuous. Embodiments of the present invention recognize that an activation function that enables a neural net to learn a discontinuous function, enabling the neural net to estimate the selectivity of one or more predicates on a table in a database, is of high value to a query optimization process.

FIG. 1 depicts client system 101 that is connected to server system 105 via connection 102, network 103, and connection 104. In some scenarios and embodiments, server system 105 hosts relational DBMS (database management system) 106 which contains query processor 108. Query processor 108 develops and optimizes a plan for executing a query that it receives from client system 101. In an embodiment, client system 101 submits a query to relational DBMS 106, which transfers the query to query processor 108 for processing. Query processor 108 analyzes the query, forms an efficient query plan, and executes the query plan by accessing appropriate data in storage 107 via data connection 109. Query processor 108 transfers the result of the query to relational DBMS 106, which transfers it to server system 105. Server system 105 transfers the result of the query to client system 101 via connection 104, network 103 and connection 102.

Figure 2:
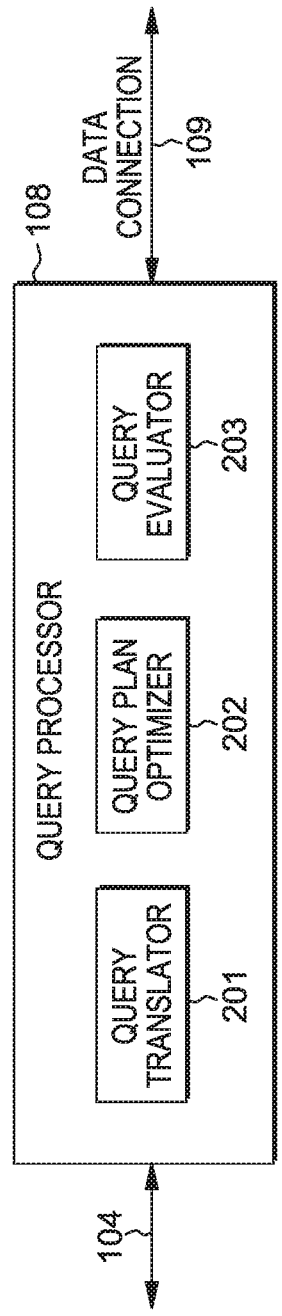
FIG. 2 depicts a block diagram of the query processor depicted in FIG. 1, in accordance with an embodiment of the present invention.

FIG. 2 depicts query processor 108 in more detail. In some scenarios and embodiments, query processor 108 is comprised of query translator 201, query plan optimizer 202, and query evaluator 203. In an embodiment, query translator 201 checks a query for syntactic and semantic correctness and then decomposes the query into one or more predicates that express the conditions that must be met by the data requested by the query. Query plan optimizer 202 analyzes one or more predicates generated by query translator 201 and generates a query plan that includes the preferred order in which the predicates are to be applied. In an embodiment, query evaluator 203 executes the query plan generated by query plan optimizer 202 during which it accesses data in storage 107 over data connection 109.

Figure 3:
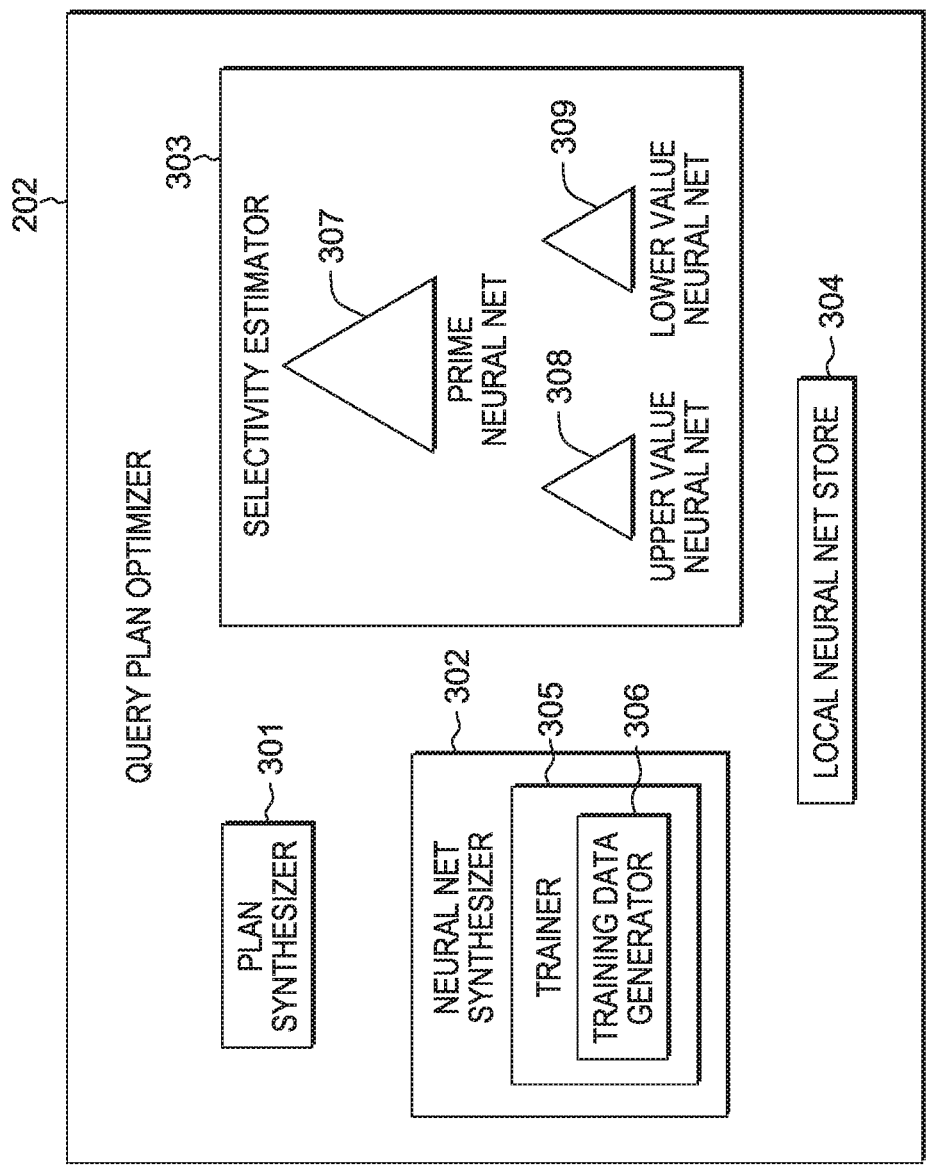
FIG. 3 depicts a detail of the query plan optimizer depicted in FIG. 2, in accordance with an embodiment of the present invention.

FIG. 3 depicts query plan optimizer 202 in more detail. In some scenarios and embodiments, query plan optimizer 202 includes plan synthesizer 301, neural net synthesizer 302, and selectivity estimator 303. In an embodiment, query plan optimizer 202 also contains local neural net store 304 that stores the configuration parameters (e.g., neural net connection weights) of frequently used neural nets. Plan synthesizer 301 receives one or more predicates generated by query translator 201. Plan synthesizer 301 evaluates one or more potential query plans, searching for the best one. Plan synthesizer 301 evaluates a candidate query plan that involves estimating the selectivity of one or more predicates by forming an argument to a selectivity function with the upper and lower limits of the predicates in the candidate query plan. For example, the predicate $l_1 \leq t.c1 \leq u_1$ has $l_1$ as a lower limit and $u_1$ as an upper limit (t.c1 indicates that the limits are applied to objects in column 1 of table t). Such a predicate is called a range predicate. In an embodiment, all the range predicates in a query plan pertain to the same table in the database, however, each predicate (and the upper and lower limit in that predicate) in a query plan pertains to a different column in the table.

The selectivity function that takes the upper and lower limits of n range predicates (one upper and lower limit for each table column involved) as arguments is: $Sel(l_1, u_1, \ldots, l_n, u_n)=c$, where c is a value in the range [0.0, 1.0] and represents the resulting combined filtering effect of the range predicates in the query. An equality predicate (with comparison operator =) can be replaced with two range predicates that use the comparison operators $\geq$ (herein called greater than or equal to operator) and $\leq$ (herein called less than or equal to operator). As such, in some embodiments and scenarios, both upper and lower limits are applied to the same value in the selectivity function. Similarly a predicate with a comparison operator <> (herein called less than or greater than operator) can be represented as two disjunctive predicates and appropriately represented in the arguments of the selectivity function as two range predicates. A neural net computes the selectivity function Sel and returns the estimated selectivity of the predicates in the candidate query plan. In an embodiment, each range predicate, i.e., each pair of upper and lower limits, is associated with a column of data in the same table in the database. A given neural net is trained on a given set of range predicates whose limits may be different with each use, i.e., a given neural net is trained on the data distribution in a given set of columns specific to that neural net. The limits imposed on the data in each column are the variables in the argument to the selectivity function. In other words, the columns associated with the limits stay the same for each use of a given neural net, and only the limits can change with each use of the neural net.

In an embodiment of the present invention, the range predicates in the query contain only non-strict range operators. If the query contains one or more strict range operators, e.g., < (herein called less than operator), > (herein called greater than operator), = (herein called equal operator), or <> (herein called less than or greater than operator), plan synthesizer 301 invokes upper value neural net 308 and/or lower value neural net 309 to convert the strict range operator to one or more non-strict range operators (e.g., a less than or equal to operator and/or a greater than or equal to operator). A strict range operator, e.g., <, can be expressed in terms of a non-strict range operator, e.g., $\leq$, because the following is true: $l_1 < t.c1 < u_1 \Leftrightarrow l_1^+ \leq t.c1 \leq u_1^-$, where $l_1$ is a lower limit, $u_1$ is an upper limit, $l_1^+$ is the smallest actual value greater than $l_1$ in column 1 of table t, and $u_1^-$ is the largest actual value smaller than $u_1$ in column 1 of table t. Upper value neural net 308 replaces an upper limit of a strict range operator with an upper limit of a non-strict range operator and lower value neural net 309 replaces a lower limit of a strict range operator with a lower limit of a non-strict range operator. Plan synthesizer 301 forms a selectivity function argument that is comprised of the limits of only non-strict range operators and sends that selectivity function argument to selectivity estimator 303. Selectivity estimator 303 then calculates the estimated selectivity of the non-strict range operators and their associated limits.

Selectivity estimator 303 receives a selectivity function argument from plan synthesizer 301 and computes the Sel function using prime neural net 307. Selectivity estimator 303 returns the result, an estimated selectivity, to plan synthesizer 301.

In an embodiment, prime neural net 307, upper value neural net 308, and lower value neural net 309 use a jump sigmoid function as their activation function. In an embodiment, a jump sigmoid function is:

$$\varphi_k(x) = \begin{cases} 0 & \text{for } x < 0 \\ (1 - e^{-x})^k & \text{for } x \geq 0 \end{cases} \quad \text{Equation (2)}$$

In equation 2, a linear combination of functions $\varphi_k$ for $k=0, 1, 2, 3, \ldots$ can approximate any bounded function with a finite jump (i.e., a finite discontinuity) to any desired accuracy. In an embodiment, k is the parameter of a jump sigmoid function and x is the value of the input to the function. The jump sigmoid function enables a neural net to learn the Sel function, which is a discontinuous function.

In an embodiment, neural net synthesizer 302 forms a new neural net to estimate a selectivity of a Sel function whose argument has not been seen previously by selectivity estimator 303. In an embodiment, neural net synthesizer 302 includes trainer 305, which computes appropriate weights for the new neural net. Trainer 305 includes training data generator 306 that generates appropriate training data. The training data is derived from metadata related to column data distribution statistics, queries with various predicates for which the actual result set cardinalities are known, and the execution of queries with various predicates to determine known result set cardinalities for the training data. The new neural net is trained on this training data.

In an embodiment, trainer 305 uses a technique called back-propagation to train the new neural net. In an embodiment, local neural net store 304 stores the configurations of one or more frequently used neural nets so that the neural nets are available quickly. In an embodiment, the configurations of less frequently used neural nets are stored in a database. In an embodiment, when selectivity estimator 303 receives a selectivity function argument, it determines if the appropriate neural net for that argument has been stored in local neural net store 304 first, then determines if it has been stored in a database. In an embodiment, if an appropriate neural net is not available, then selectivity estimator 303 sends the selectivity argument to neural net synthesizer 302 to have it generate an appropriate neural net, which is returned to selectivity estimator 303.

Figure 4:
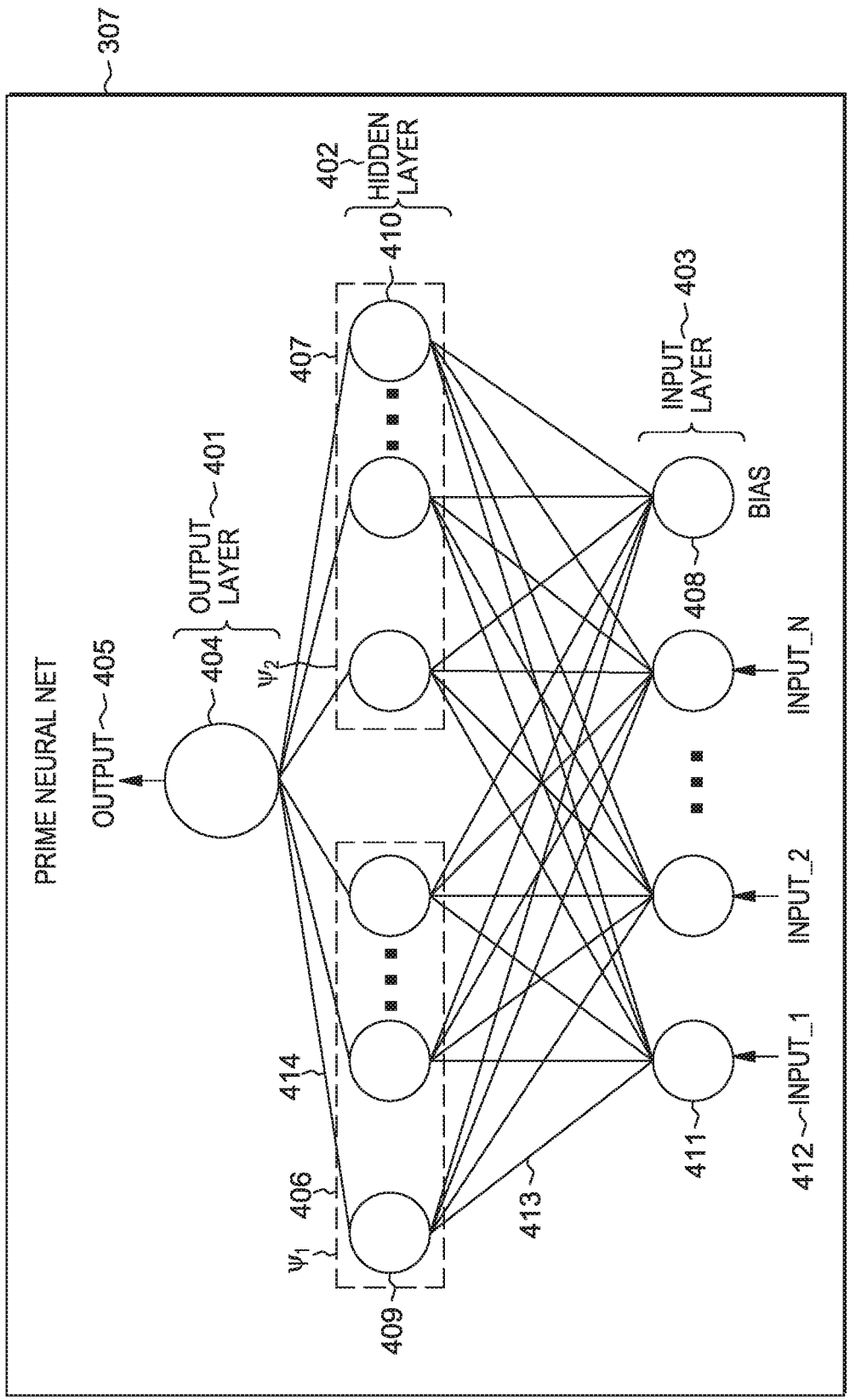
FIG. 4 depicts a detail of the prime neural network depicted in FIG. 3, in accordance with an embodiment of the present invention.

FIG. 4 depicts prime neural net 307 in more detail. In an embodiment, prime neural net 307 is comprised of three layers of artificial neurons (nodes), input layer 403, hidden layer 402, and output layer 401. Layers of artificial neurons in a neural network that are not observable from its inputs or outputs are called hidden layers. In an embodiment, prime neural net 307 is a feed forward network, meaning that it contains no connection loops that would allow an output of an artificial neuron to feed back to the input of an artificial neuron (even indirectly) and change the output of the network at a later time. In other embodiments, neural net 307 is a recurrent network, meaning that one or more outputs of one or more artificial neurons provide feedback to one or more inputs of one or more artificial neurons in the network. In an embodiment, prime neural net 307 is fully connected, that is, each artificial neuron in a layer, e.g., a layer L, receives an input from each artificial neuron in the preceding layer L−1, and projects its outputs to every artificial neuron in the following layer L+1. In an embodiment, prime neural net 307 is not fully connected. In an embodiment, all the artificial neurons in input layer 403 have only one input each except bias artificial neuron 408, which has no inputs.

Input layer 403 contains an artificial neuron for each specific limit in the argument of the selectivity function Sel, i.e., each limit in the argument is mapped to the single input of a dedicated artificial neuron. There is a one-to-one mapping of limits in the argument to artificial neurons in input layer 403. For example, input artificial neuron 411 in input layer 403 receives input_1 412 on its input, which is a value in the argument of selectivity function Sel. Bias artificial neuron 408 has no input and outputs a constant value of one on each of its outputs. During the training of prime neural net 307, the weights assigned to the outputs of bias artificial neuron 408 are adjusted and enable the output of prime neural net to be shifted to increase the accuracy of the Sel function computed by prime neural net 307.

In an embodiment, hidden layer 402 is comprised of two groups of artificial neurons, artificial neuron group 406 and artificial neuron group 407. In an embodiment, artificial neurons in hidden layer artificial neuron group 406 use activation function $\Psi_1$ that is parameterized differently from activation function $\Psi_2$ that is used in hidden layer artificial neuron group 407. For example, artificial neuron 409 in hidden layer artificial neuron group 406 uses activation function $\Psi_1$ and artificial neuron 410 in hidden layer artificial neuron group 407 uses activation function $\Psi_2$. Artificial neuron 409 receives input 413 from artificial neuron 411 in input layer 403 and outputs a value on output 414, which is an input to output artificial neuron 404. The groups of hidden layer artificial neurons, each group using an activation function that is parameterized differently (i.e., with different values assigned to the parameters of its activation function), can often be trained to handle discontinuities in the selectivity function Sel more accurately than a single group of neurons using an activation function with identical parameters. In another embodiment, more than two groups of artificial neurons in the hidden layer, each group using a differently parameterized activation function, are used. The number of groups used in the hidden layer in prime neural net 307 depends on the number of differently parameterized jump sigmoid functions that are found to be necessary during training of prime neural net 307 to approximate the Sel function. In another embodiment, all artificial neurons in the hidden layer use an activation function that is parameterized identically. Output artificial neuron 404 receives an input from each artificial neuron in hidden layer 402 and computes output 405, which is the estimated selectivity of the query whose non-strict range predicate limits comprise the argument to Sel and are the inputs to input layer 403 in prime neural net 307.

Figure 5:
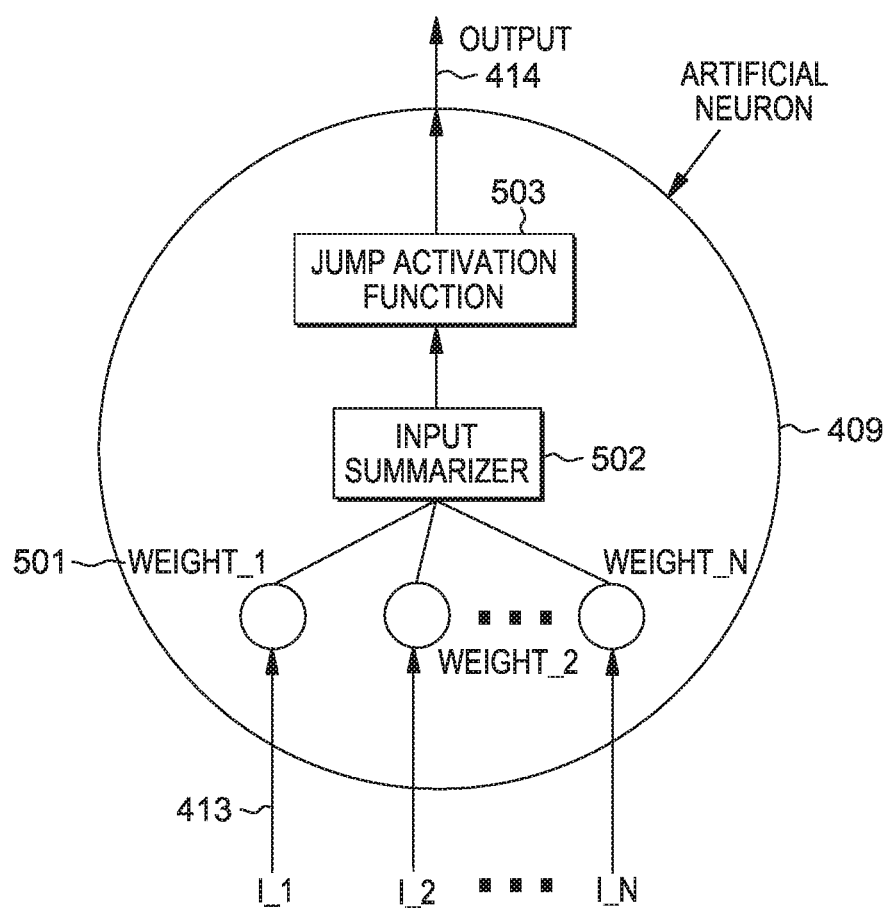
FIG. 5 depicts a detail of an artificial neuron depicted in FIG. 3, in accordance with an embodiment of the present invention.

FIG. 5 depicts artificial neuron 409 in hidden layer 402 in more detail. All the artificial neurons in prime neural net 307 are essentially similar to artificial neuron 409 with the exception of bias artificial neuron 408, which differs from artificial neuron 409 only in that it has no inputs. The value on an input to artificial neuron 409 is multiplied by a weight that is assigned to that input during the training of prime neural net 307. After the value on each input is weighted by being multiplied by the weight that is assigned to that input, all the resulting weighted values from all inputs are summed in input summarizer 502. For example, a value on input I_1 413 is multiplied by weight 501 and then the result of this multiplication is an input to input summarizer 502, where it is summed with the other weighted inputs to artificial neuron 409. While the value on input I_1 413 can vary for each selectivity calculation that prime neural net 307 performs, weight 501 will remain constant for each calculation regardless of the input to prime neural net 307. A weight is assigned to each input on each artificial neuron during the initial training of prime neural net 307 and these weights remain constant unless they are reassigned during another training round. In an embodiment, prime neural net 307 is retrained, during which the weights can be, and are, modified, if it becomes inaccurate in calculating the selectivity of the arguments for which it has been trained.

Input summarizer 502 sums the weighted inputs to neuron 409 and the sum is input to jump activation function 503. The output of input summarizer 502 is: $\Sigma_j w_j x_j$ where $w_j$ is the weight of the $j^{th}$ input to neuron 409 and $x_j$ is the value on the $j^{th}$ input to neuron 409. The output of input summarizer 502 is the input argument to jump activation function 503, which calculates output 414, the output of neuron 409. Output 414 is an input to output neuron 405.

Figure 6:
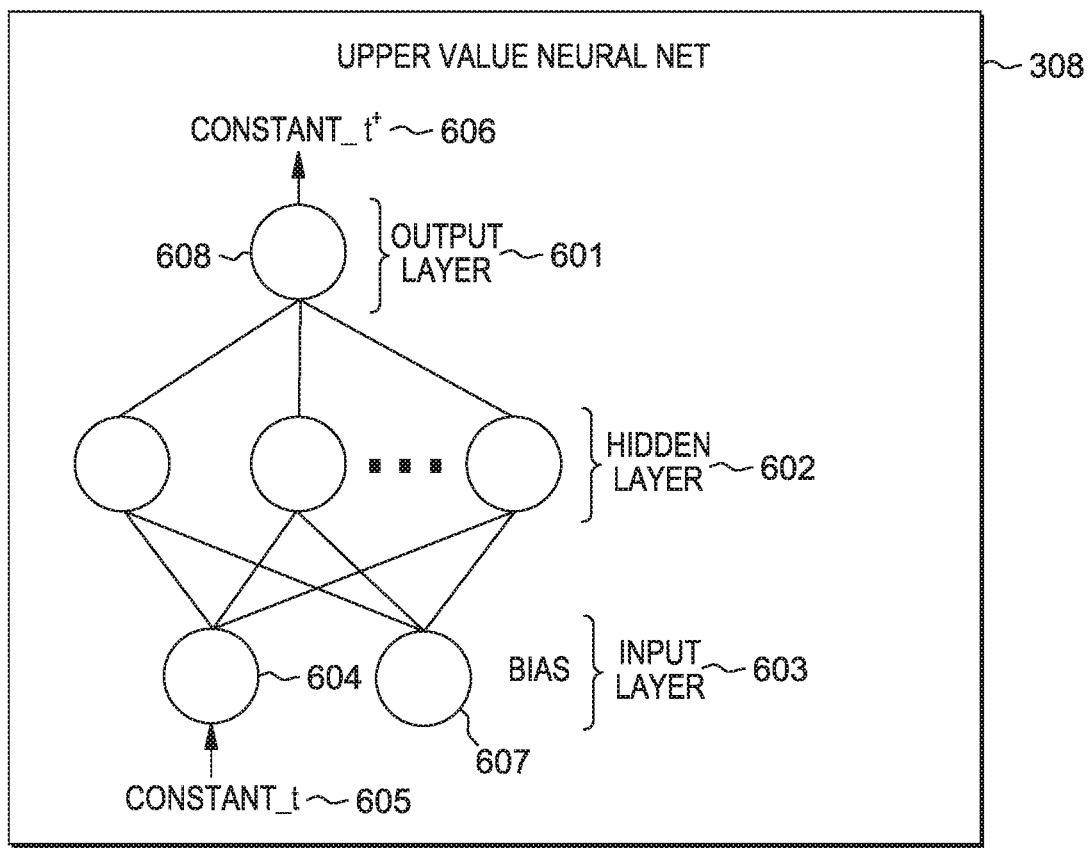
FIG. 6 depicts a detail of the upper value neural network depicted in FIG. 3, in accordance with an embodiment of the present invention.

FIG. 6 depicts upper value neural net 308 in more detail. In an embodiment, upper value neural net 308 is comprised of three layers of artificial neurons, input layer 603, hidden layer 602, and output layer 601. In an embodiment, upper value neural net 308 is a feed forward network. In other embodiments, upper value neural net 308 is a recurrent network. In an embodiment, upper value neural net 308 is fully connected. In an embodiment, upper value neural net 308 is not fully connected. In an embodiment, there is one artificial neuron in input layer 603, artificial neuron 604, which has constant_t 605 as its input, in addition to bias artificial neuron 607, which has no inputs. Constant_t 605 is a limit associated with a strict range operator, e.g., <, and may or may not be a value that exists in the column in the table on which the strict range operator is operating. Upper value neural net 308 calculates an actual value that exists in the column that is the smallest value greater than constant_t 605 and outputs this value, constant_t$^+$ 606, from artificial neuron 608 in output layer 601. The calculation of constant_t$^+$ 606 enables the strict range operator that is associated with constant_t 605 to be converted to a non-strict range operator that is associated with constant_t$^+$ 606.

Figure 7:
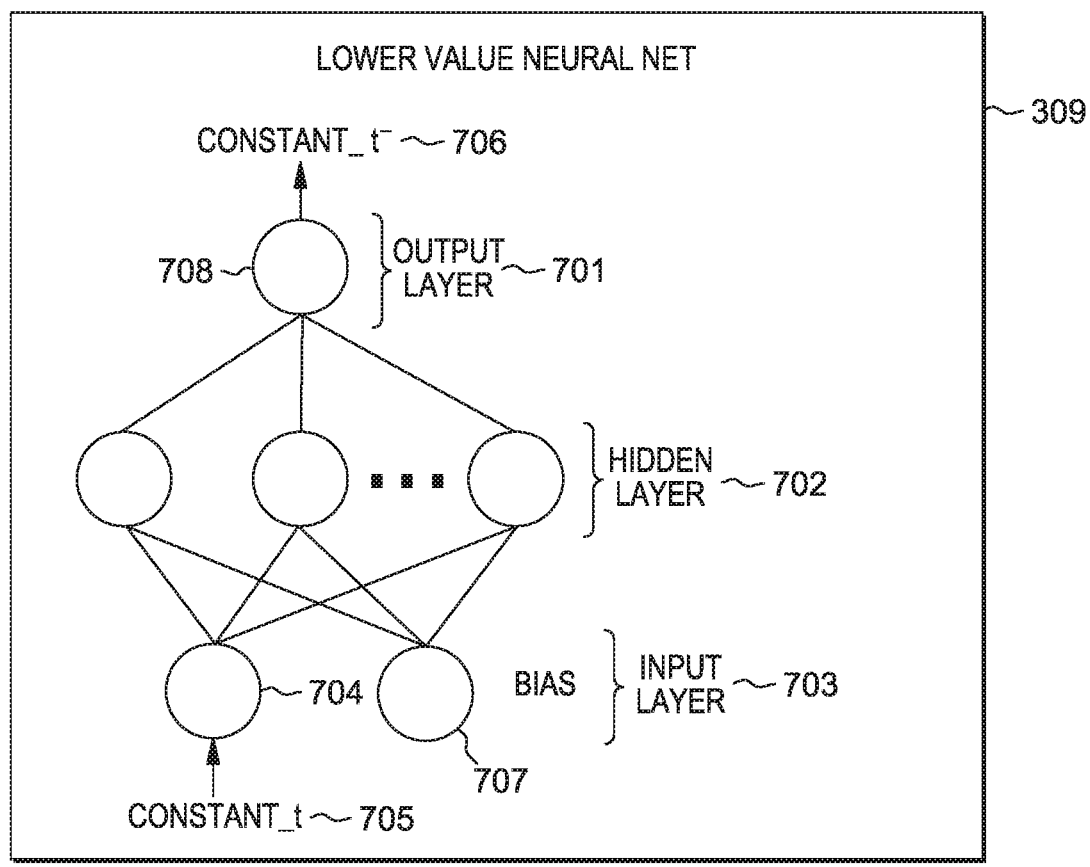
FIG. 7 depicts a detail of the lower value neural network depicted in FIG. 3, in accordance with an embodiment of the present invention.

FIG. 7 depicts lower value neural net 309 in more detail. In an embodiment, lower value neural net 309 is comprised of three layers of artificial neurons, input layer 703, hidden layer 702, and output layer 701. In an embodiment, lower value neural net 309 is a feed forward network. In other embodiments, lower value neural net 309 is a recurrent network. In an embodiment, lower value neural net 309 is fully connected. In an embodiment, lower value neural net 309 is not fully connected. In an embodiment, there is one artificial neuron in input layer 703, artificial neuron 704, which has constant_t 705 as its input, in addition to bias artificial neuron 707, which has no inputs. Constant_t 705 is a limit associated with a strict range operator, e.g., < and may or may not be a value that exists in the column in the table on which the strict range operator is operating. Lower value neural net 309 calculates an actual value that exists in the column that is the smallest value greater than constant_t 705 and outputs this value, constant_t$^-$ 706, from artificial neuron 708 in output layer 701. The calculation of constant_t$^-$ 706 enables the strict range operator that is associated with constant_t 705 to be converted to a non-strict range operator that is associated with constant_t⁻ 706.

Figure 8:
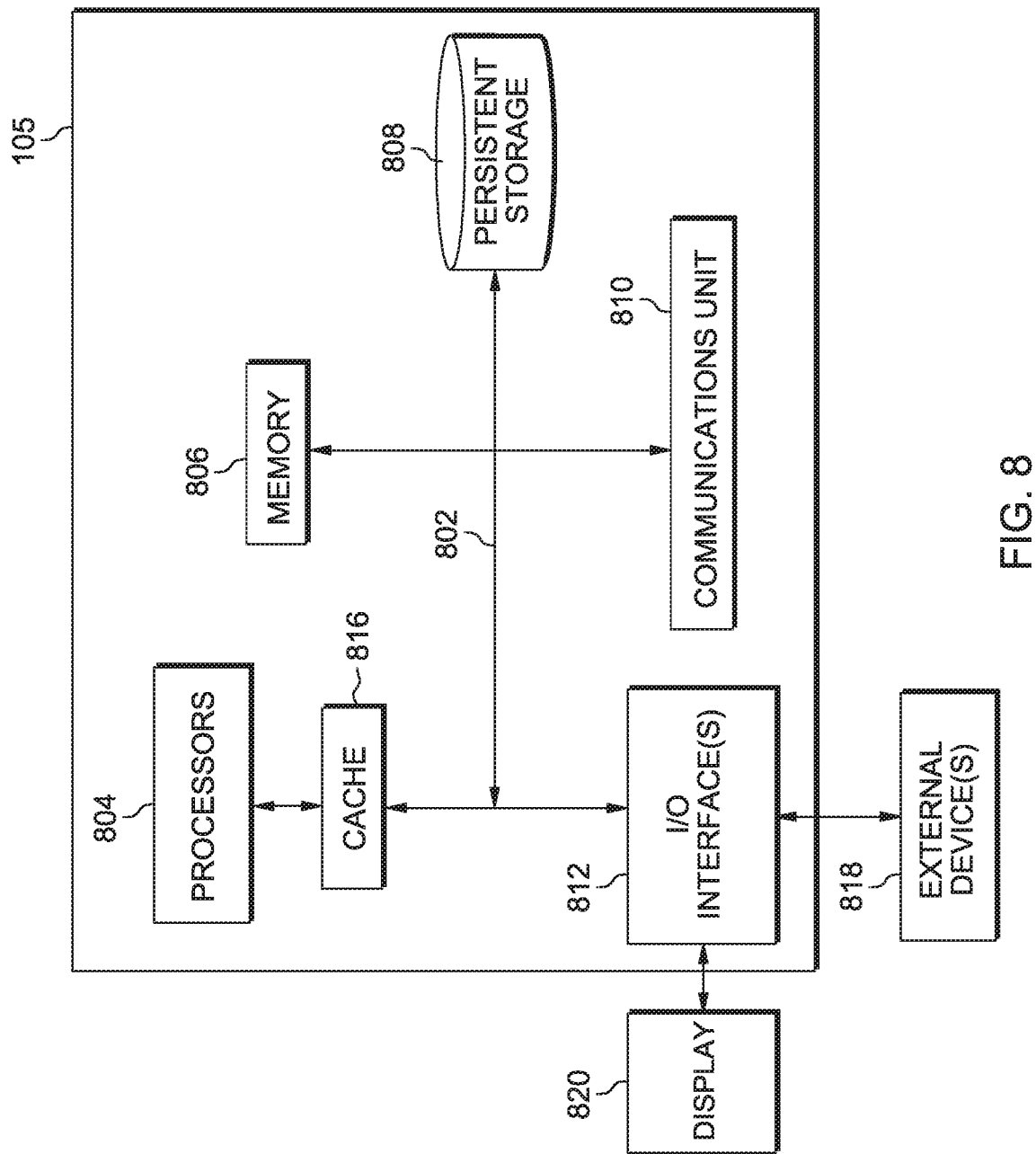
FIG. 8 depicts a block diagram of a computer system that incorporates the query processor that is depicted in FIGS. 1, 2, 3, 4, 5, 6, and 7, in accordance with an embodiment of the present invention.

FIG. 8 depicts an exemplary embodiment of server system 105, which hosts relational DBMS 106 and query processor 108. Server system 105 includes processors 804, cache 816, and communications fabric 802, which provides communications between cache 816, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer readable storage media. In this embodiment, memory 806 includes random access memory (RAM). In general, memory 806 can include any suitable volatile or non-volatile computer readable storage media. Cache 816 is a fast memory that enhances the performance of processors 804 by holding recently accessed data and data near accessed data from memory 806.

Program instructions and data used to practice embodiments of the present invention may be stored in persistent storage 808 for execution by one or more of the respective processors 804 via cache 816 and one or more memories of memory 806. In an embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices. In these examples, communications unit 810 includes one or more network interface cards. Communications unit 810 may provide communications through the use of either or both physical and wireless communications links. Program instructions and data used to practice embodiments of the present invention may be downloaded to persistent storage 808 through communications unit 810.

I/O interface(s) 812 allows for input and output of data with other devices that may be connected to each computer system. For example, I/O interface 812 may provide a connection to external devices 818 such as a keyboard, keypad, a touch screen, and/or some other suitable input device. External devices 818 can also include portable computer readable storage media such as, for example, thumb drives, portable optical or magnetic disks, and memory cards. Software and data used to practice embodiments of the present invention can be stored on such portable computer readable storage media and can be loaded onto persistent storage 808 via I/O interface(s) 812. I/O interface(s) 812 also connects to a display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

Each respective figure, in addition to illustrating methods of and functionality of the present invention at various stages, also illustrates the logic of the method as implemented, in whole or in part, by one or more devices and structures. Such devices and structures are configured to (i.e., include one or more components, such as resistors, capacitors, transistors and the like that are connected to enable the performing of a process) implement the method of merging one or more non-transactional stores and one or more thread-specific transactional stores into one or more cache line templates in a store buffer in a store cache. In other words, one or more computer hardware devices can be created that are configured to implement the method and processes described herein with reference to the Figures and their corresponding descriptions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable others of ordinary skill in the art to understand the embodiments disclosed herein.

Embodiments of the present invention may be used in a variety of electronic applications, including but not limited to advanced sensors, memory/data storage, semiconductors, microprocessors and other applications.

A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may be included by only some of the described embodiments. Accordingly, the invention is not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later come to be known to those of ordinary skill in the art are expressly incorporated herein by reference and intended to be encompassed by the invention. It is therefore to be understood that changes may be made in the particular embodiments disclosed which are within the scope of the present invention as outlined by the appended claims.

What is claimed is:

1. A computer implemented method, the method comprising:
   generating, by one or more processors, an artificial neural network with a hidden layer comprising one or more neurons, wherein the one or more neurons are grouped into one or more groups of neurons, wherein each neuron in a group of neurons in the one or more groups of neurons compute with a common jump activation function;
   receiving, by one or more processors, a DBMS query comprising one or more predicates, wherein a predicate in the one or more predicates operates on one or more database columns;
   generating, by one or more processors, one or more converted predicates by converting one or more strict range operators in the one or more predicates to one or more non-strict range operators in the one or more predicates;
   generating, by one or more processors, a selectivity function argument from the one or more converted predicates, wherein the selectivity function argument has one or more arguments, and wherein an argument in the one or more arguments is an upper bound and a lower bound for a value in a first database column that meets a predicate in the one or more converted predicates;
   generating, by one or more processors, a training data set for the artificial neural network from a data distribution in the one or more database columns;
   training, by one or more processors, the artificial neural network on the training data set to compute the selectivity function using the selectivity function argument; and
   generating, by one or more processors, a selectivity estimation with the artificial neural network for the one or more converted predicates in the DBMS query.

2. The method of claim 1, wherein converting, by one or more processors, one or more strict range operators to non-strict range operators is comprised of:
   replacing, by one or more processors, a first predicate, in the one or more predicates, that operates on a first value with an equal to operator, with a second predicate that operates on the first value with a greater than or is equal to operator and a third predicate that operates on the first value with an is less than or is equal to operator;
   replacing, by one or more processors, a fourth predicate, in the one or more predicates, that operates on a second value in a first database column with a is less than or is greater than operator, with a fifth predicate that operates on the second value with a is greater than operator and a sixth predicate that operates on the second value with a is less than operator;
   replacing, by one or more processors, a strict range greater than operator in a seventh predicate, in the one or more predicates, that operates on a third value in a second database column, with a non-strict range greater than or equal to operator that operates on a fourth value in the second database column, wherein the fourth value is a smallest value in the second database column that is greater than the third value; and
   replacing, by one or more processors, a strict range less than operator in an eighth predicate, in the one or more predicates, that operates on a fifth value in a third database column, with a non-strict range less than or equal to operator that operates on a sixth value in the third database column, wherein the sixth value is a largest value in the third database column that is less than the fifth value.

3. The method of claim 1, wherein the jump activation function in a neuron in the one or more neurons is:

$$\varphi_k(x) = \begin{cases} 0 & \text{for } x < 0 \\ (1 - e^{-x})^k & \text{for } x \geq 0 \end{cases},$$

wherein x is a value computed from one or more inputs to the neuron and k is a positive integer.

4. The method of claim 1, wherein the output of the artificial neural network is a linear combination of an output from one or more neurons in the hidden layer.

5. The method of claim 2, wherein the fourth value is computed with an upper bound artificial neural network that takes the third value as an input and the sixth value is computed with a lower bound artificial neural network that takes the fifth value as an input.

6. The method of claim 1, wherein the artificial neural network is a recurrent artificial neural network.

7. The method of claim 3, wherein the hidden layer is comprised of a first group of neurons that uses the jump activation function with k=1 and a second group of neurons that uses the jump activation function with k=2.

8. The method of claim 1, wherein the jump activation function is a non-constant, bounded, continuous, and monotonically increasing function.

9. The method of claim 1, the method further comprising:
processing, by one or more processors, the DBMS query according to a query plan, wherein the query plan: (i) is based on the generated selectivity estimation and (ii) specifies an order in which predicates are to be applied to process the DBMS query.

10. The method of claim 1, the method further comprising:
training, by one or more processors, the artificial neural network on the training data set to estimate the cardinality of rows selected by each predicate.

* * * * *